US010891860B2

(12) United States Patent
Goldberg

(10) Patent No.: US 10,891,860 B2
(45) Date of Patent: *Jan. 12, 2021

(54) APPARATUS AND ASSOCIATED METHODS FOR NAVIGATION OF ROAD INTERSECTIONS

(71) Applicant: HERE Global B.V., Eindhoven (NL)

(72) Inventor: Alexander James Goldberg, Oceanside, CA (US)

(73) Assignee: HERE Global B.V., Eindhoven (NL)

( * ) Notice: Subject to any disclaimer, the term of this patent is extended or adjusted under 35 U.S.C. 154(b) by 304 days.

This patent is subject to a terminal disclaimer.

(21) Appl. No.: 15/269,519

(22) Filed: Sep. 19, 2016

(65) Prior Publication Data

US 2017/0004708 A1    Jan. 5, 2017

Related U.S. Application Data

(63) Continuation of application No. 14/455,454, filed on Aug. 8, 2014, now Pat. No. 9,470,536.

(51) Int. Cl.
*B60W 30/18* (2012.01)
*G08G 1/0967* (2006.01)
(Continued)

(52) U.S. Cl.
CPC . *G08G 1/096775* (2013.01); *B60W 30/18154* (2013.01); *G01C 21/20* (2013.01);
(Continued)

(58) Field of Classification Search
CPC ............ C08G 1/096775; C08G 1/0112; C08G 1/012; C08G 1/0129; C08G 1/0141;
(Continued)

(56) References Cited

U.S. PATENT DOCUMENTS

| 5,559,707 A | 9/1996 | Delorme et al. |
| 6,321,158 B1 | 11/2001 | Delorme et al. |

(Continued)

FOREIGN PATENT DOCUMENTS

EP    1489383 A2    12/2004

OTHER PUBLICATIONS

Notification of Transmittal of The International Search Report and The Written Opinion of The International Searching Authority; International Search Report and Written Opinion of The International Searching Authority for corresponding International Application No. PCT/IB2015/055411, dated Oct. 16, 2015, 12 Pages.

(Continued)

*Primary Examiner* — Richard A Goldman
(74) *Attorney, Agent, or Firm* — Ditthavong & Steiner, P.C.

(57) ABSTRACT

An apparatus comprising a processor and memory including computer program code, the memory and computer program code configured to, with the processor, enable the apparatus at least to:
identify, for use in route navigation, a complete set of lane traversals for a road intersection from two or more different complete sets of lane traversals for the road intersection based on respective safety-traffic flow scores assigned according to one or more predefined safety-traffic flow criteria,
wherein each lane traversal defines a path of travel from an inbound lane of the road intersection to an outbound lane of the road intersection, and
wherein each different complete set of lane traversals comprises a different combination of lane traversals for the road intersection.

20 Claims, 11 Drawing Sheets

(51) Int. Cl.
*G01C 21/20* (2006.01)
*G01C 21/36* (2006.01)
*G08G 1/01* (2006.01)
*G08G 1/0968* (2006.01)
*G08G 1/0969* (2006.01)
*G01C 21/34* (2006.01)
*G01S 19/13* (2010.01)

(52) U.S. Cl.
CPC ............ *G01C 21/34* (2013.01); *G01C 21/367* (2013.01); *G01C 21/3658* (2013.01); *G01S 19/13* (2013.01); *G08G 1/012* (2013.01); *G08G 1/0112* (2013.01); *G08G 1/0129* (2013.01); *G08G 1/0141* (2013.01); *G08G 1/0969* (2013.01); *G08G 1/096827* (2013.01); *G08G 1/096861* (2013.01)

(58) Field of Classification Search
CPC ............ C08G 1/0145; C08G 1/096827; C08G 1/096861; C08G 1/0969; C08G 1/096805; C08G 1/096833; G01C 21/20; G01C 21/34; G01C 21/3658; G01C 31/367; G01S 19/13; G06K 9/00978; B60W 2552/00; B60W 2552/05; B60W 2552/10; B60W 2552/20; B60W 2552/50; B60W 2552/53; B60W 30/18154; B60W 30/18159
USPC .......................... 701/533, 400, 423; 340/905
See application file for complete search history.

(56) References Cited

U.S. PATENT DOCUMENTS

| | | | | |
|---|---|---|---|---|
| 6,510,386 | B2 | 1/2003 | Sakashita | |
| 7,376,508 | B2 | 5/2008 | Barkowski et al. | |
| 7,680,749 | B1 * | 3/2010 | Golding | G01C 21/3484 706/14 |
| 9,470,536 | B2 * | 10/2016 | Goldberg | G01C 21/3658 |
| 10,699,347 | B1 * | 6/2020 | Slusar | G06Q 40/08 |
| 10,703,362 | B2 * | 7/2020 | Maura | G05D 1/0088 |
| 2009/0138188 | A1 | 5/2009 | Kores et al. | |
| 2013/0103300 | A1 * | 4/2013 | Rakthanmanon .. | G01C 21/3492 701/408 |
| 2013/0173150 | A1 | 7/2013 | Ghisio | |
| 2013/0226454 | A1 | 8/2013 | Hisano | |
| 2014/0062725 | A1 * | 3/2014 | Maston | G08G 1/0112 340/905 |
| 2015/0345964 | A1 * | 12/2015 | Oooka | B60W 30/16 701/41 |
| 2016/0040993 | A1 * | 2/2016 | Goldberg | G01C 21/3658 701/533 |
| 2017/0004708 | A1 * | 1/2017 | Goldberg | G08G 1/096827 |
| 2017/0011465 | A1 * | 1/2017 | Anastassov | G06Q 40/08 |
| 2017/0241791 | A1 * | 8/2017 | Madigan | G06Q 40/08 |
| 2018/0144201 | A1 * | 5/2018 | Yoshihira | B60W 30/095 |
| 2018/0276485 | A1 * | 9/2018 | Heck | G06K 9/6218 |
| 2018/0345963 | A1 * | 12/2018 | Maura | B60W 30/12 |
| 2019/0236942 | A1 * | 8/2019 | Toshack | G08G 1/087 |
| 2020/0017102 | A1 * | 1/2020 | Gassmann | B60W 30/09 |
| 2020/0217678 | A1 * | 7/2020 | Jones | G01C 21/3492 |
| 2020/0273197 | A1 * | 8/2020 | Zhao | G06T 7/70 |

OTHER PUBLICATIONS

Fohl et al., "A Non-Planar, Lane-Based Navigable Data Model for ITS", Proceedings of the International Symposium on Spatial Data Handling, Aug. 1, 1996, 8 Pages.

Office Action for related European Patent Application No. 15 742 112.4-1003, dated May 8, 2019, 5 pages.

* cited by examiner

APPARATUS AND ASSOCIATED METHODS FOR NAVIGATION OF ROAD INTERSECTIONS

RELATED APPLICATION

This application is a continuation of U.S. patent application Ser. No. 14/455,454, filed Aug. 8, 2014, and entitled "AN APPARATUS AND ASSOCIATED METHODS FOR NAVIGATION OF ROAD INTERSECTIONS", which is incorporated herein by reference in its entirety.

TECHNICAL FIELD

The present disclosure relates to the field of route navigation, associated methods and apparatus, and in particular concerns an apparatus configured to identify a set of lane traversals for a road intersection from two or more different sets of lane traversals for the road intersection based on respective safety-traffic flow scores assigned according to one or more predefined safety-traffic flow criteria. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop improved navigation devices which can provide a user with more detailed information about road networks to further aid route navigation.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:

identify, for use in route navigation, a complete set of lane traversals for a road intersection from two or more different complete sets of lane traversals for the road intersection based on respective safety-traffic flow scores assigned according to one or more predefined safety-traffic flow criteria, wherein each lane traversal defines a path of travel from an inbound lane of the road intersection to an outbound lane of the road intersection, and wherein each different complete set of lane traversals comprises a different combination of lane traversals for the road intersection.

Each of the different complete sets of lane traversals may be produced by associating one or more inbound lanes of the road intersection with one or more outbound lanes of the road intersection to define said paths of travel from the inbound lanes to the outbound lanes. This may be performed by the apparatus, or by a further apparatus which is remote to or separate from the apparatus.

The two or more different complete sets of lane traversals may be predetermined by filtering all possible complete sets of lane traversals for the road intersection to leave only complete sets of lane traversals which comprise one or more pre-travelled lane traversals. This may be performed by the apparatus, or by a further apparatus which is remote to or separate from the apparatus. These pre-travelled traversals may be reported directly by vehicles and or inferred from probe data (cloud-sourced) of traffic flows, or traversals identified by visual recognition algorithms (e.g. recognized road markings, vehicle paths identified by security feeds).

The two or more different complete sets of lane traversals may be predetermined to comprise only complete sets of lane traversals which satisfy one or more predefined safety-traffic flow rules. This may be performed by the apparatus, or by a further apparatus which is remote to or separate from the apparatus. The one or more predefined safety-traffic flow rules may comprise at least one of: any lane traversals which begin on the same road segment cannot cross paths; and each inbound lane of the road intersection must be associated with one (or at least one) outbound lane of the road intersection.

A complete set might be considered to be such that each inbound lane has to be associated with one (or at least one) outbound lane traversal.

The two or more different complete sets of lane traversals may be predetermined by filtering all possible complete sets of lane traversals for the road intersection to account for one or more known safety-traffic flow restrictions. This may be performed by the apparatus, or by a further apparatus which is remote to or separate from the apparatus. The one or more known safety-traffic flow restrictions may comprise at least one of: turn restrictions, access restrictions, medians, road types, signal controls, traffic patterns, tolls, road works, and road markings.

The two or more different complete sets of lane traversals may be predetermined by filtering all possible complete sets of lane traversals for the road intersection to leave only complete sets of lane traversals which satisfy one or more user-defined safety-traffic flow preferences. This may be performed by the apparatus, or by a further apparatus which is remote to or separate from the apparatus. The one or more user-defined safety-traffic flow preferences may comprise at least one of desirable lane traversals, undesirable lane traversals, desirable types of lane traversal and undesirable types of lane traversal. These may be defined by a user of a map-editing application, for example.

The respective safety-traffic flow scores may be assigned to each of the two or more different complete sets of lane traversals based on one or more of the following safety-traffic flow criteria: the geometry of the paths of travel defined by the constituent lane traversals; and the occurrence of one or more predefined safety-traffic flow features within the complete set of lane traversals. This may be performed by the apparatus, or by a further apparatus which is remote to or separate from the apparatus. The one or more predefined safety-traffic flow features of the complete set of lane traversals may comprise at least one of: unmapped outbound lanes, unmapped inbound lanes, merging lanes, forming lanes and lane gaps.

The respective safety-traffic flow scores may be assigned to each of the two or more different complete sets of lane traversals by:
   identifying any constituent lane traversals which define a substantially straight path of travel;
   assigning a geometry score to each substantially straight lane traversal based on the curvature of its associated path of travel;
   identifying the occurrence of one or more predefined safety-traffic flow features within the complete set of lane traversals;
   assigning a penalty score to each of the identified predefined safety-traffic flow features; and
   combining the geometry and penalty scores to produce a total score for the complete set of lane traversals.

This may be performed by the apparatus, or by a further apparatus which is remote to or separate from the apparatus. The apparatus or further apparatus may be configured to identify the occurrence of one or more predefined safety-traffic flow features within the substantially straight lane traversals only.

The apparatus may be configured to identify the complete set of lane traversals with the highest or lowest safety-traffic flow score for use in route navigation.

The apparatus may be configured to provide an aggregate safety-traffic flow score for a given geographic area by combining the safety-traffic flow scores of the respective identified sets of lane traversals for a plurality of different road intersections within the geographic area. The aggregate safety-traffic flow score may be a total or average safety-traffic flow score for the geographic area.

The apparatus may be configured to generate one or more of: a poor-scoring indicator when the identified complete set of lane traversals has been assigned a safety-traffic flow score which is above or below a predefined safety-traffic flow score threshold; a similarly-scoring indicator when two or more different complete sets of lane traversals have been assigned a substantially similar safety-traffic flow score resulting in no single identifiable complete set of lane traversals; and a penalty indicator when the identified complete set of lane traversals breaches one or more predefined safety-traffic flow rules or comprises one or more predefined safety-traffic flow features.

The road intersection may be predefined by one or more of the number, location, size, shape, geometry (e.g. crossroad geometry, T junction geometry etc.) and traffic flow direction of its inbound and outbound lanes. This may be performed by the apparatus, or by a further apparatus which is remote to or separate from the apparatus.

The road intersection may comprise one or more of a signalised intersection, and un-signalised intersection, a junction, a crossroad, a roundabout, an interchange, an onramp, an off-ramp, a road or lane merge, and a road or lane split.

The apparatus may be one or more of an electronic device, a portable electronic device, a portable telecommunications device, a satellite navigation device, a mobile phone, a phablet device, a tablet device, a server and a module for the same.

According to a further aspect, there is provided a method comprising:
   identifying, for use in route navigation, a complete set of lane traversals for a road intersection from two or more different complete sets of lane traversals for the road intersection based on respective safety-traffic flow scores assigned according to one or more predefined safety-traffic flow criteria,
   wherein each lane traversal defines a path of travel from an inbound lane of the road intersection to an outbound lane of the road intersection, and
   wherein each different complete set of lane traversals comprises a different combination of lane traversals for the road intersection.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC
ASPECTS/EMBODIMENTS

Traditional road maps provide limited information about lanes at road intersections. The presence of lane data has applications beyond traditional road-based route guidance. For example, lane data enables lane-level guidance and visualization of lane manoeuvres at road intersections. Lane data is also critical for Highly Automated Driving (HAD) applications.

Whilst modern maps may provide information about the number, location, geometry and traffic flow direction of the inbound and outbound lanes at a road intersection, they provide little information on lane traversals at the intersection, that is, the available paths of travel from the inbound lanes to the outbound lanes. Furthermore, the determination of lane traversals at a road intersection is traditionally a tedious process involving the manual analysis of aerial or ground imagery and subsequent digitization. This highly manual process makes it costly to perform large-scale coverage of lane traversals.

There will now be described an apparatus and associated methods that may or may not provide a solution to one or more of these issues.

Figure 1:
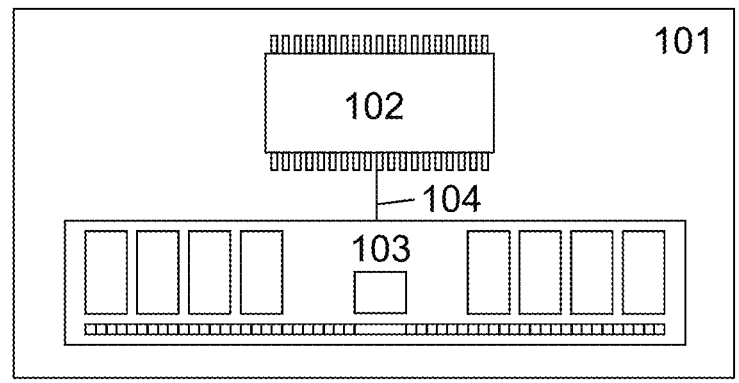
FIG. 1 illustrates schematically an apparatus configured to perform one or more methods described herein.

FIG. 1 shows an apparatus 101 configured to perform one or more methods described herein. The apparatus 101 may be one or more of an electronic device, a portable electronic device, a portable telecommunications device, a satellite navigation device, a mobile phone, a phablet device, a tablet device, a server, and a module for the same.

The apparatus 101 comprises a processor 102 and memory 103, which are electrically connected to one another by a data bus 104. The processor 102 is configured for general operation of the apparatus 101 by providing signaling to, and receiving signaling from, the other components to manage their operation. The memory 103 is configured to store computer program code configured to perform, control or enable operation of the apparatus 101. The memory 103 may also be configured to store settings for the other components. The processor 102 may access the memory 103 to retrieve the component settings in order to manage the operation of the other components. The processor 102 may be a microprocessor, including an Application Specific Integrated Circuit (ASIC). The memory 103 may be a temporary storage medium such as a volatile random access memory. On the other hand, the memory 103 may be a permanent storage medium such as a hard disk drive, a flash memory, or a non-volatile random access memory.

In particular, the memory 103 and computer program code are configured to, with the processor 102, enable the apparatus 101 to identify, for use in route navigation, a complete set of lane traversals for a road intersection from two or more different complete sets of lane traversals for the road intersection based on respective safety-traffic flow scores assigned according to one or more predefined safety-traffic flow criteria.

Each lane traversal defines a path of travel from an inbound lane of the road intersection to an outbound lane of the road intersection, and each different complete set of lane traversals comprises a different combination/permutation of lane traversals for the road intersection. Furthermore, as described later, the safety-traffic flow criteria are predefined to improve safety (e.g. reduce collisions) and efficiency (e.g. reduce congestion) whilst travelling through the road intersection. In this way, the apparatus 101 is able to provide a user with lane guidance at a given road intersection which enables the user to safely and efficiently travel from an inbound lane of the road intersection to an outbound lane of the road intersection.

Before the apparatus 101 can identify a suitable set of lane traversals for use in route navigation, a number of prerequisite steps must be performed. Some or all of these prerequisite steps may be performed by the apparatus 101 itself, or by a further apparatus (not shown) which is remote to or separate from the apparatus 101.

The first step is defining the road intersection for which the two or more different complete sets of lane traversals can be determined. The term "road intersection" as used herein may be taken to mean any section of a road network where two or more roads or lanes intersect. For example, the road intersection may comprise one or more of a signalised intersection, an un-signalised intersection, a junction, a crossroad, a roundabout, an interchange, an onramp, an off-ramp, a road or lane merge, and a road or lane split.

Figure 2:
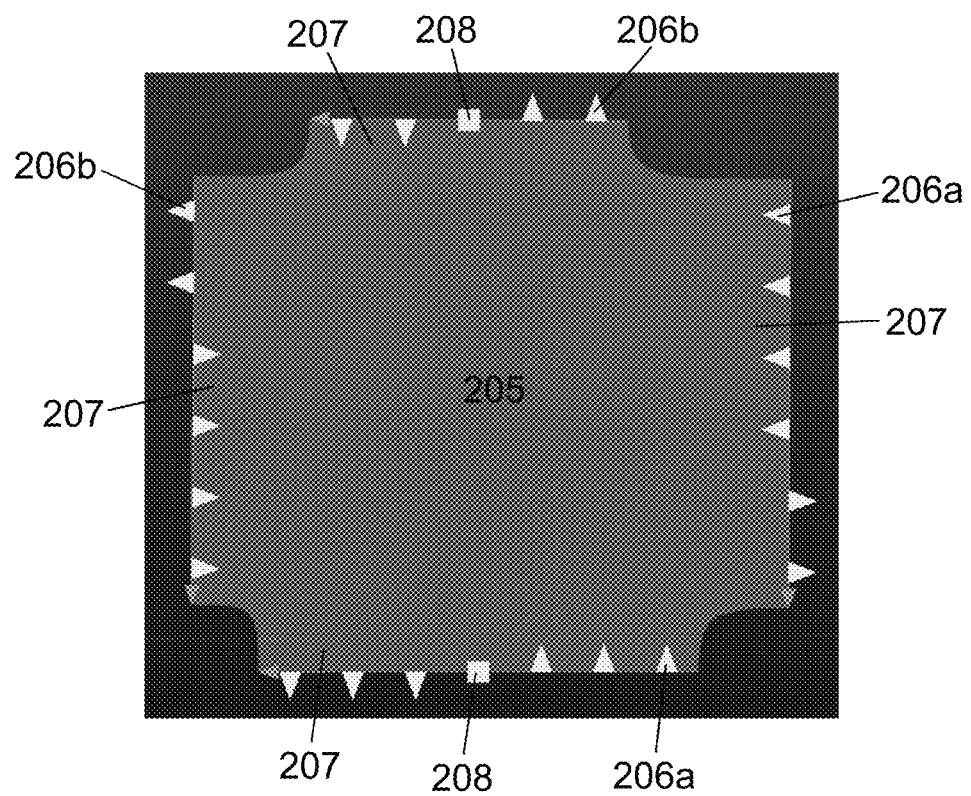
FIG. 2 illustrates schematically one example of a road intersection.

FIG. 2 shows one example of a road intersection 205 to which the present method may be applied. In order to define the road intersection 205, one or more of the number, location, size, shape, geometry, and traffic flow direction of its inbound 206a and outbound 206b lanes may be determined. This information could be automatically extracted from a map by the apparatus or further apparatus (e.g. based on one or more predefined rules or criteria), or it could be provided to the apparatus or further apparatus (e.g. manually input). In the example shown, the road intersection 205 is a crossroad comprising four connected road segments 207 each with various numbers of inbound 206a and outbound 206b lanes. The traffic flow direction of each lane 206a,b is indicated by the arrowheads. Two of the road segments 207 also have a median 208 (e.g. central reservation) as denoted by the squares. Once the road intersection 205 has been defined, the two or more different complete sets of lane traversals for the road intersection 205 can be determined.

Figure 3A:
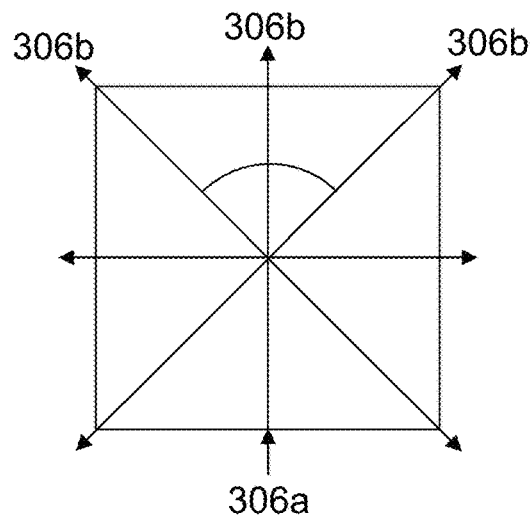
FIG. 3a illustrates schematically a substantially straight lane traversal.
Figure 3B:
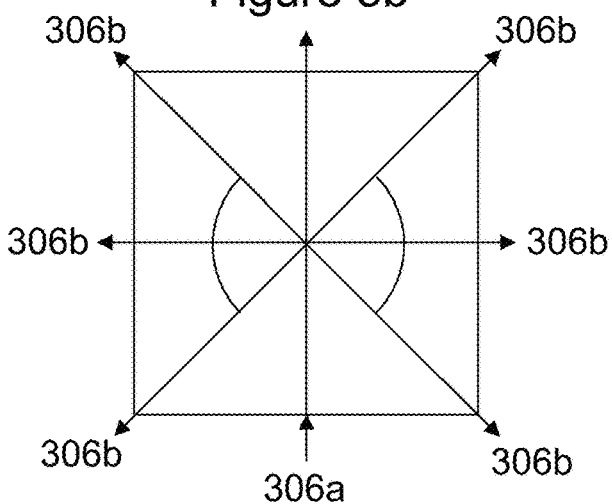
FIG. 3b illustrates schematically a turn lane traversal.
Figure 3C:
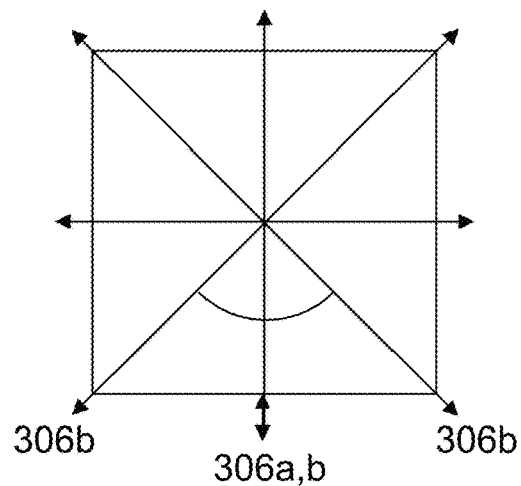
FIG. 3c illustrates schematically a u-turn lane traversal.

FIGS. 3a-3c show possible definition of angles use to define different types of lane traversal. As illustrated, the various lane traversals may be divided into three main categories: "straight" traversals, "turn" traversals and "u-turn" traversals, the significance of which will be described later. In this example, straight traversals define paths of travel in which the outbound lane 306b is oriented ±0°-45° with respect to the inbound lane 306a (FIG. 3a); turn traversals define paths of travel in which the outbound lane 306b is oriented ±46°-135° with respect to the inbound lane 306a (FIG. 3b); and u-turn traversals define paths of travel in which the outbound lane 306b is oriented ±136°-180° with respect to the inbound lane 306a (FIG. 3c). Other angles can, of course, be used. For example 110° can be used instead of 135° to define an upper bound of the transition before a u-turn traversal is considered to have been defined.

Figure 4A:
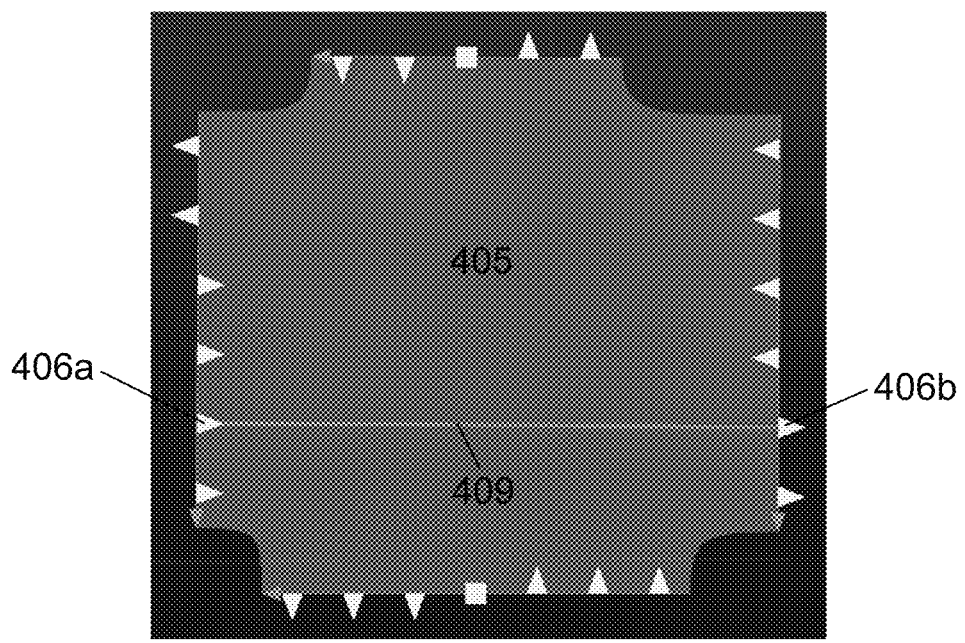
FIG. 4a illustrates schematically a substantially straight lane traversal which defines a path of travel having a low degree of curvature.
Figure 4B:
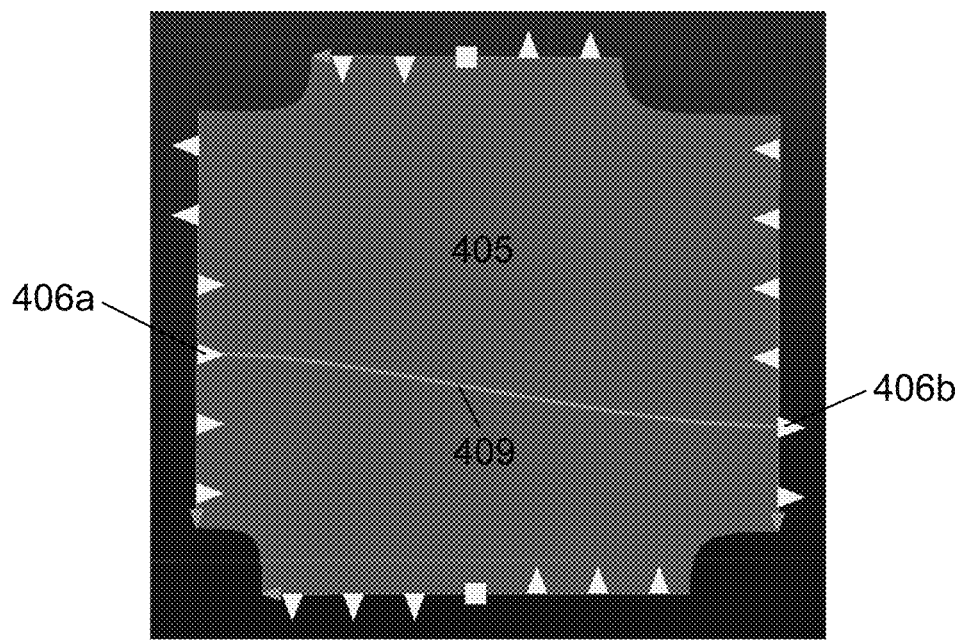
FIG. 4b illustrates schematically a substantially straight lane traversal which defines a path of travel having a medium degree of curvature.
Figure 4C:
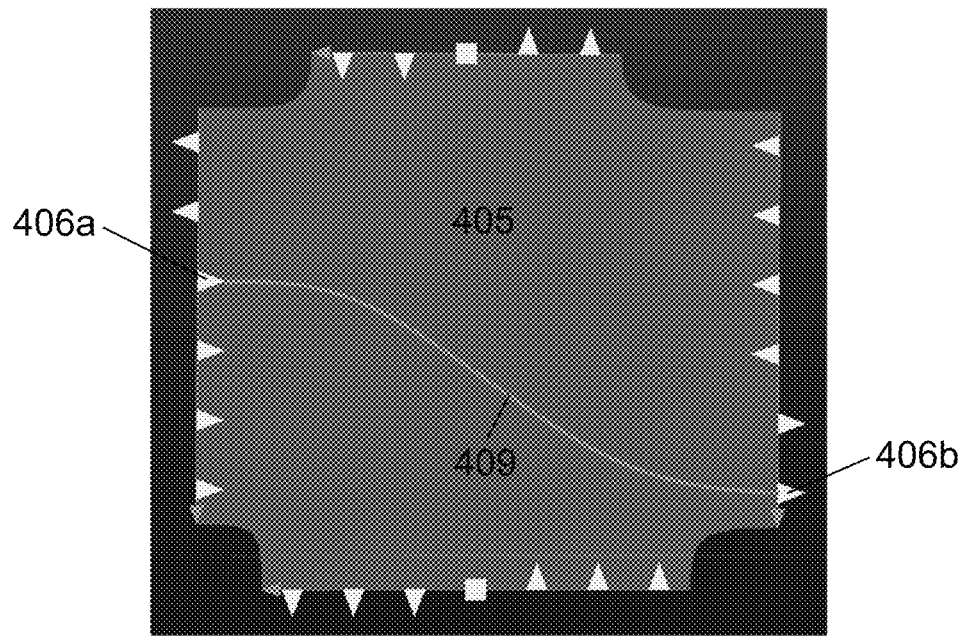
FIG. 4c illustrates schematically a substantially straight lane traversal which defines a path of travel having a high degree of curvature.

FIGS. 4a-4c show different types of straight lane traversal 409. The straight traversals 409 (or substantially straight, as the case may be) could be sub-divided into three further categories based on their degree of curvature: "low" curvature (FIG. 4a), "medium" curvature (FIG. 4b) and "high" curvature (FIG. 4c), the significance of which will also be described later. Various curvature ranges can be set for each category of straight lane traversal 409 and may depend on the particular road intersection 405 or road network under consideration.

Each of the different complete sets of lane traversals 409 are produced by associating one or more inbound lanes 406a of the road intersection 405 with one or more outbound lanes 406b of the road intersection 405 to define the paths of travel from the inbound lanes 406a to the outbound lanes 406b. This process may be repeated to determine all possible complete sets of lane traversals 409 for the road intersection 405 (i.e. all permutations) using one or more predefined safety-traffic flow rules (although, as mentioned below, some characteristic subsets of lane traversals can be excluded/discarded from consideration in that they would be known to have a particular low safety-traffic flow score). For example, these safety-traffic flow rules may be such that a set is considered to be complete if any lane traversals 509 which begin on the same road segment cannot cross paths and that each inbound lane of the road intersection must be associated with one or at least one outbound lane of the road intersection. In other cases, a complete set might be considered to be when each inbound lane has been associated with one or at least one outbound lane traversal.

Of course, as mentioned above, not all possible different complete sets of lane traversals need to be generated and then used in the disclosed identification process. Although this could be done, it might be too time consuming and laborious, particularly for certain complex intersections. For example, rather than generating all possible different complete sets of lane traversals, you might exclude certain sets of lane traversals with particular characteristic lane traversals if you know that they would have a poor safety-traffic flow score based on the fact that an earlier created/generated set of lane traversals (which may be a complete set, or a partial set where not each inbound lane has been associated with one or at least one outbound lane traversal) have a common characteristic set of lane traversals which led to that complete/partial set having a poor safety-traffic flow. Such cases can be considered to exclude one or more respective characteristic subsets of the sets of lane traversals for an intersection from the present disclosed identification from the two or more different complete sets of lane traversals i.e. such characteristic subsets would not be present in the two or more different complete sets of lane traversals which are used in the identification process.

As an example, in one embodiment, complete/partial sets that contain a particular characteristic subset can be excluded/discarded if they comprise traversals {A, B, C} as these traversals are known to be associated with a poor safety-traffic flow score. Thus, the sets {A, B, C, D, E} and {A, E, F, G, C, B} would be discarded.

A methodological way of building/generating lane traversal sets for different permutations might be in a manner that represents a depth-first traversal of a tree. For example, permutations could be tested in an order:

{A, B, C, D}
{A, B, C, E}
{A, B, C, F}
{A, B, G, H}
{A, B, G, I}
...

In this way it would be possible to test the safety traffic-flow score of all permutations beginning with {A} before moving on to other complete sets (and test everything beginning with {A, B} before other sets, etc.) Therefore, if the safety-traffic flow scores for {A, B} alone are worse than the current best complete set, then there would be little need to test any permutations that begin with {A, B}. It will be appreciated that the letters A, B etc. represent a particular lane traversal between a particular inbound lane and a particular outbound lane e.g. A might represent a traversal of the left-most inbound lane with the left-most outbound lane and B might represent a traversal between a particular middle inbound lane with the left-most outbound lane.

Figure 5A:
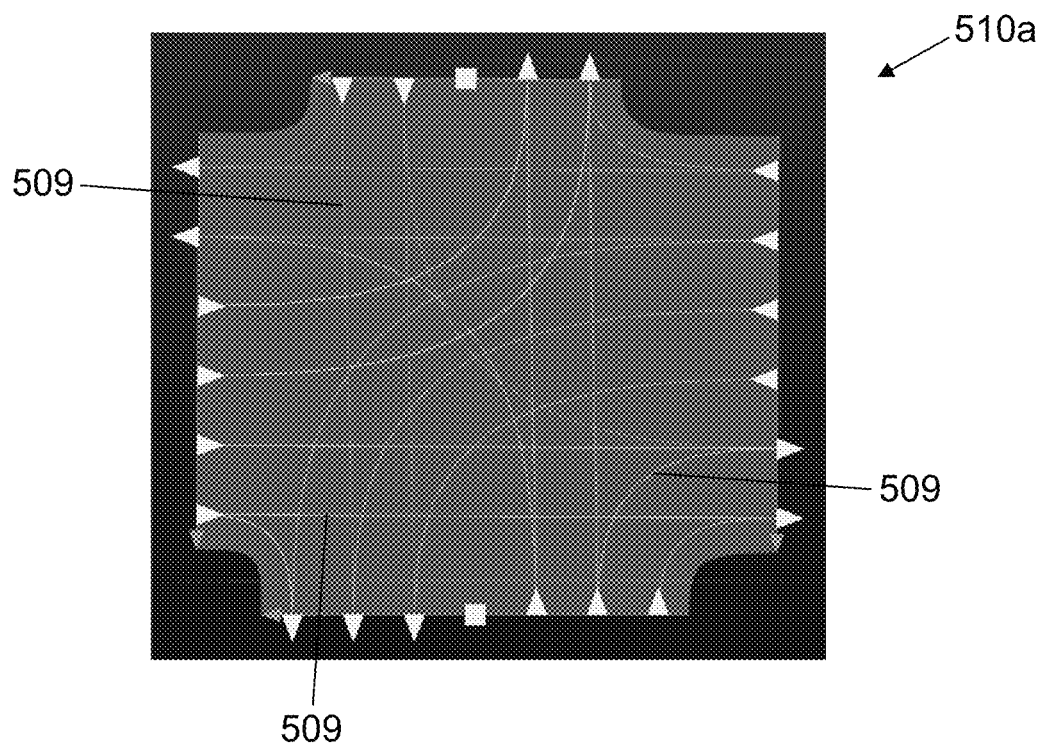
FIG. 5a illustrates schematically one example of a complete set of lane traversals for the road intersection of FIG. 2.
Figure 5B:
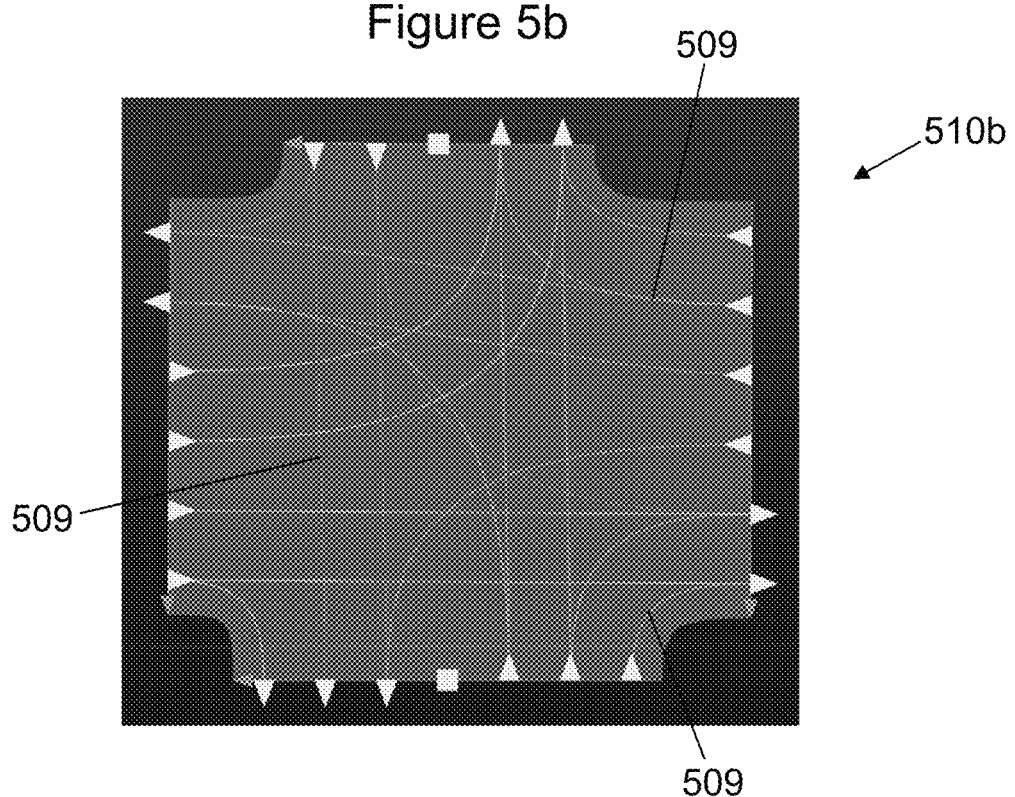
FIG. 5b illustrates schematically another example of a complete set of lane traversals for the road intersection of FIG. 2.

FIGS. 5a and 5b show two different complete sets 510a,b of lane traversals 509 which have been produced for the road intersection 505 of FIG. 2. In practice, however, not all lane traversals 509 will be legal, safe or even desirable. For example, there may be legal restrictions (e.g. no right-turn), physical restrictions (e.g. central reservation) and safety restrictions (e.g. no crossing paths of travel for simultaneously moving traffic). Furthermore, the user may have particular preferences for types of lane traversal 509 (e.g. no u-turns in general) or specific lane traversals (e.g. middle lane preferable when turning right at a particular road intersection).

In order to take the above restrictions and preferences into account, the sets 510a,b of lane traversals 509 may be filtered. In one example, the sets 510a,b of lane traversals 509 may be filtered to account for one or more known safety-traffic flow restrictions, such as: turn restrictions (e.g. no right turn, no left turn or no u-turns), access restrictions (e.g. bus or tram lanes; or road/lane closure due to height restriction, width restriction, blockage or accident), medians (e.g. cannot cross central reservation), road types (e.g. only controlled or limited access highways; heavy goods vehicles excluded from country roads; or public vehicles excluded from private roads), signal controls (e.g. avoid roads with traffic lights or stop signs), traffic patterns (e.g. traffic congestion on particular roads or lanes), tolls (e.g. avoid toll roads), road works (e.g. road or lane closed due to road works), and road markings (e.g. forced lane merges; or keep clear markings).

In a further example, the sets 510a,b of lane traversals 509 may be filtered to leave only those sets 510a,b which satisfy one or more user-defined safety-traffic flow preferences, such as: desirable lane traversals (e.g. middle lane preferable when turning right at a particular road intersection), undesirable lane traversals (e.g. avoid left turn from middle lane at a particular road intersection), desirable types of lane traversal (e.g. low curvature traversals preferred in general) and undesirable types of lane traversal (e.g. no u-turns in general).

In yet another example, the sets 510a,b of lane traversals 509 may be filtered to leave only those sets 510a,b which comprise one or more pre-traveled lane traversals. Pre-traveled lane traversals are lane traversals 509 which are already known to the apparatus or further apparatus and can therefore be used to reduce the computational burden. In some cases, multiple filters may be combined to limit the number of sets 510a,b of lane traversals 509 further.

It will be appreciated that desirable/undesirable traversals may be provided from different sources including humans defining constraints in map-editing applications, pre-traveled traversals reported from vehicles, traversals inferred from probe-data of traffic flows and traversals based on identified visual recognition algorithms (e.g. recognized road markings, vehicle paths identified using security camera feeds).

Figure 6:
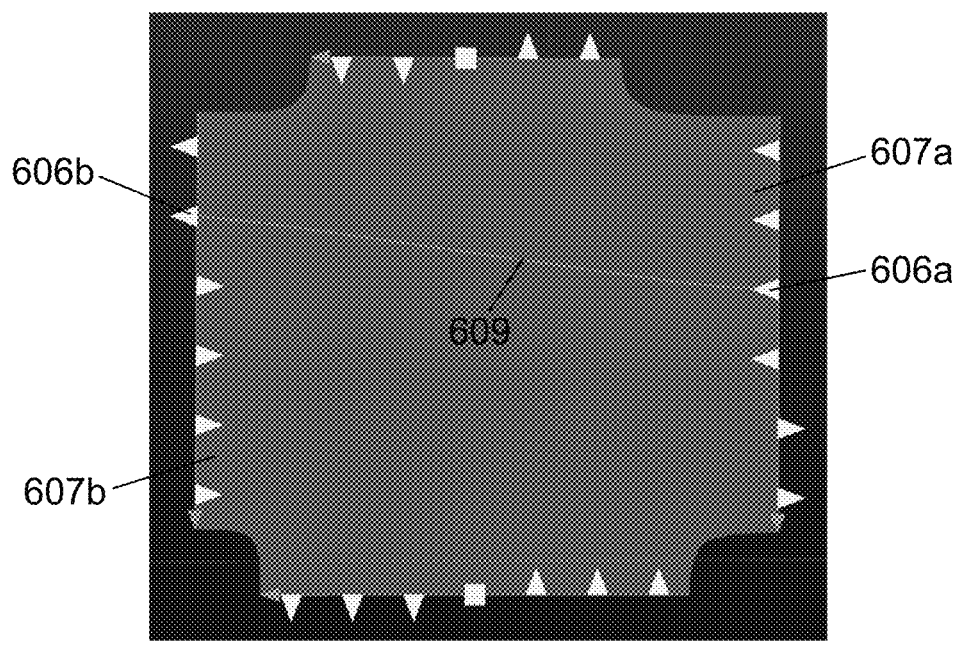
FIG. 6 illustrates schematically a user-defined lane traversal.

FIG. 6 shows an example of a user-defined safety-traffic flow preference which may be used to filter the determined sets of lane traversals. In this example, the user has specified that the second inbound lane 606a of the right-hand road segment 607a should be connected to the first outbound lane 606b of the left-hand road segment 607b. As a result of this user preference, the different sets of lane traversals would be filtered to leave only those sets which contain this particular lane traversal 609. Using the sets 510a,b of lane traversals 509 shown in FIGS. 5a and 5b as an example, this filtering step would exclude the set 510a of FIG. 5a and leave the set 510b of FIG. 5b.

Once all possible complete sets of lane traversals have been filtered to account for the various restrictions and preferences, the resulting two or more complete sets of lane traversals are assigned respective safety-traffic flow scores according to one or more predefined safety-traffic flow criteria. As mentioned previously, the safety-traffic flow criteria are predefined to improve safety and efficiency whilst travelling through the road intersection. One safety-traffic flow criterion may relate to the geometry of the paths of travel defined by the constituent lane traversals, such as the curvature of the substantially straight traversals 409 as illustrated in FIGS. 4a-4c. Another safety-traffic flow criterion may relate to the occurrence of one or more predefined safety-traffic flow features within the complete set of lane traversals, such as: unmapped outbound lanes, unmapped inbound lanes, merging lanes, forming lanes and lane gaps.

Figure 7A:
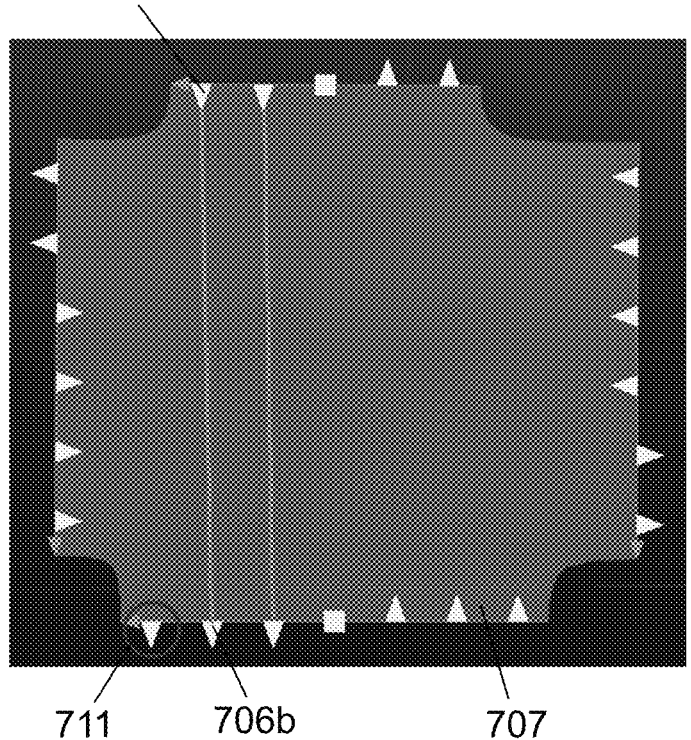
FIG. 7a illustrates schematically an unmapped outbound lane.
Figure 7B:
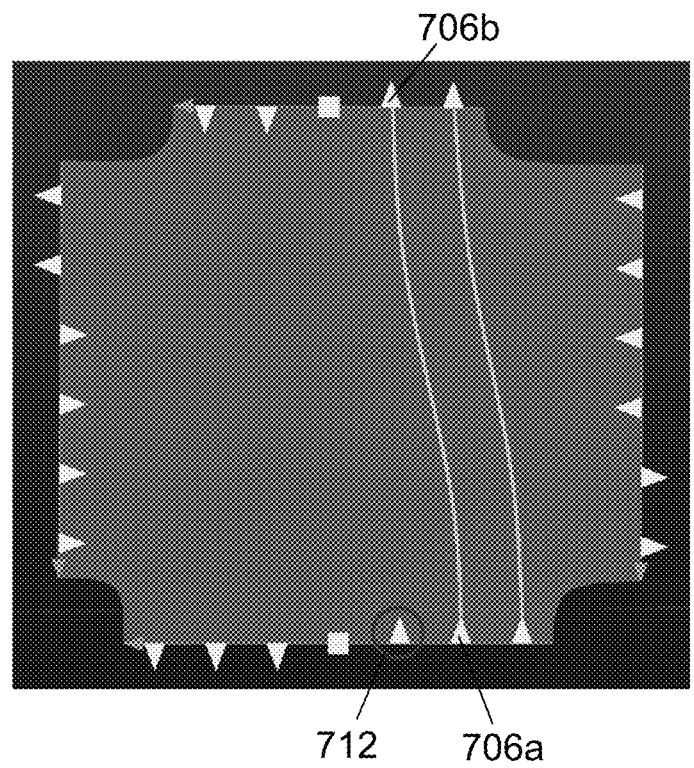
FIG. 7b illustrates schematically an unmapped inbound lane.
Figure 7C:
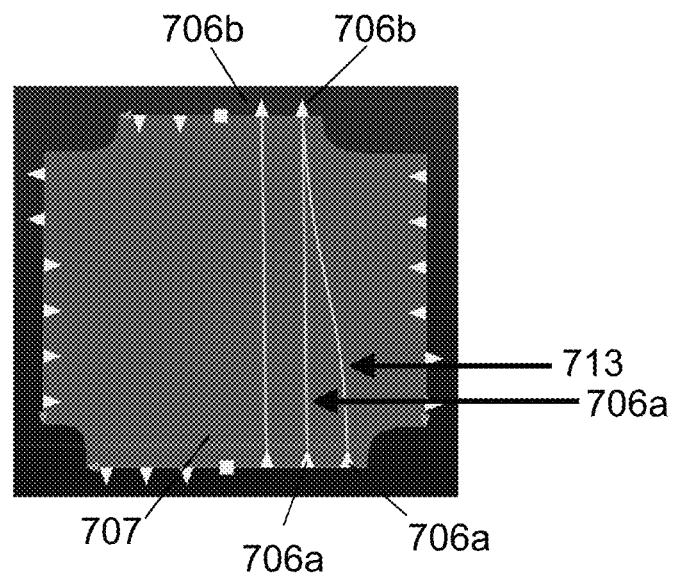
FIG. 7c illustrates schematically a merging lane.
Figure 7D:
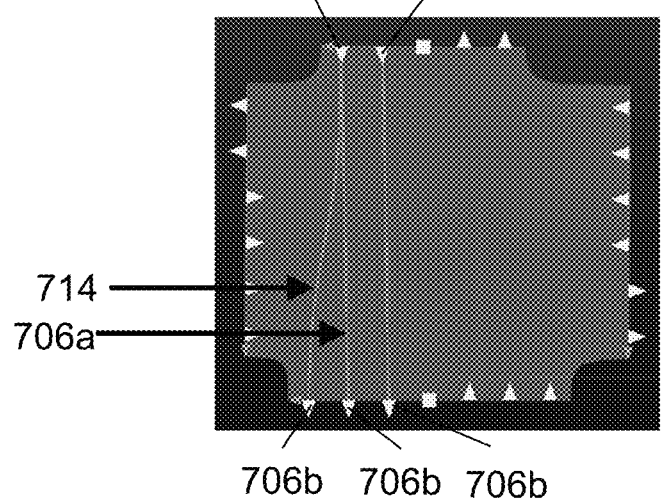
FIG. 7d illustrates schematically a forming lane.
Figure 7E:
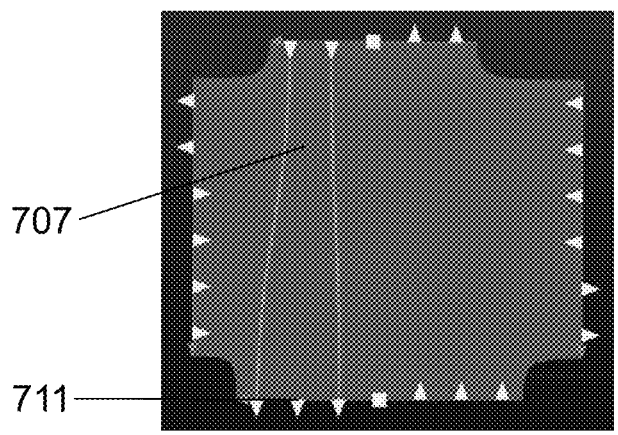
FIG. 7e illustrates a lane gap.
Figure 8A:
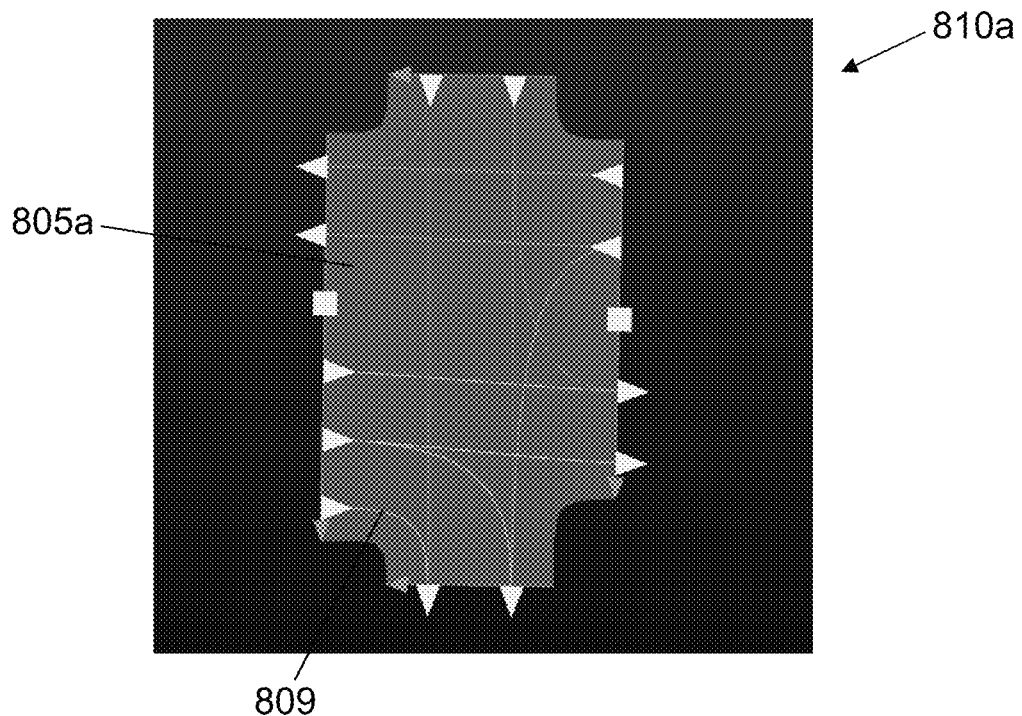
FIG. 8a illustrates schematically a complete set of lane traversals for another road intersection.
Figure 8B:
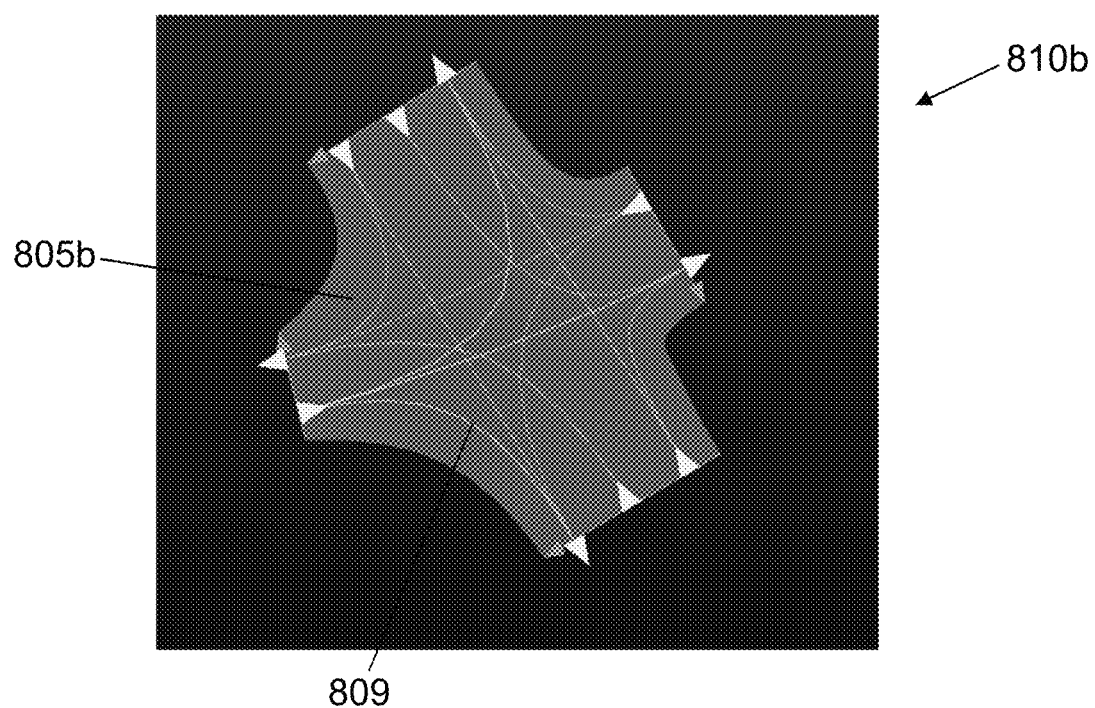
FIG. 8b illustrates schematically a complete set of lane traversals for another road intersection.
Figure 8C:
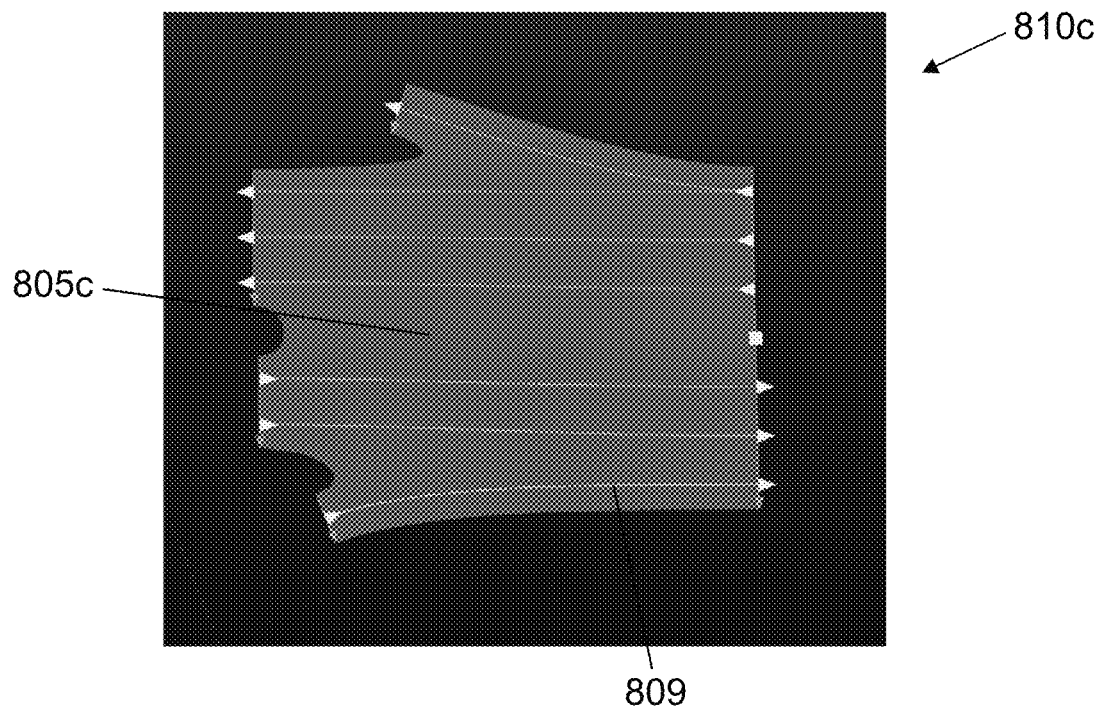
FIG. 8c illustrates schematically a complete set of lane traversals for another road intersection.
Figure 8D:
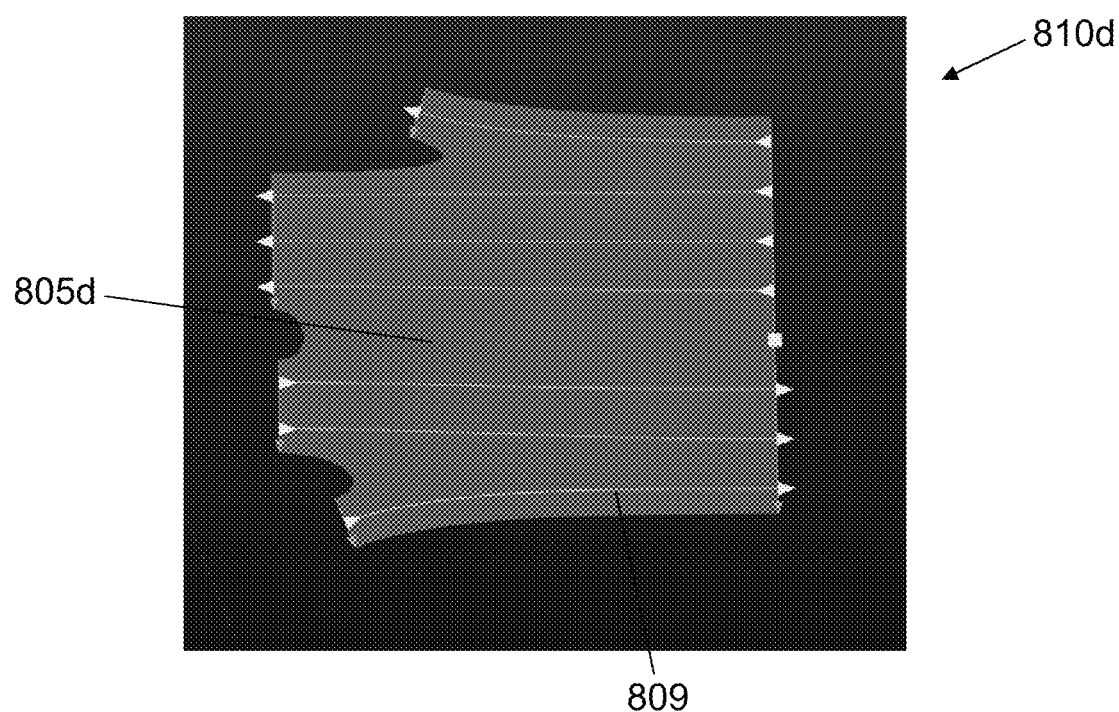
FIG. 8d illustrates schematically a complete set of lane traversals for another road intersection.
Figure 8E:
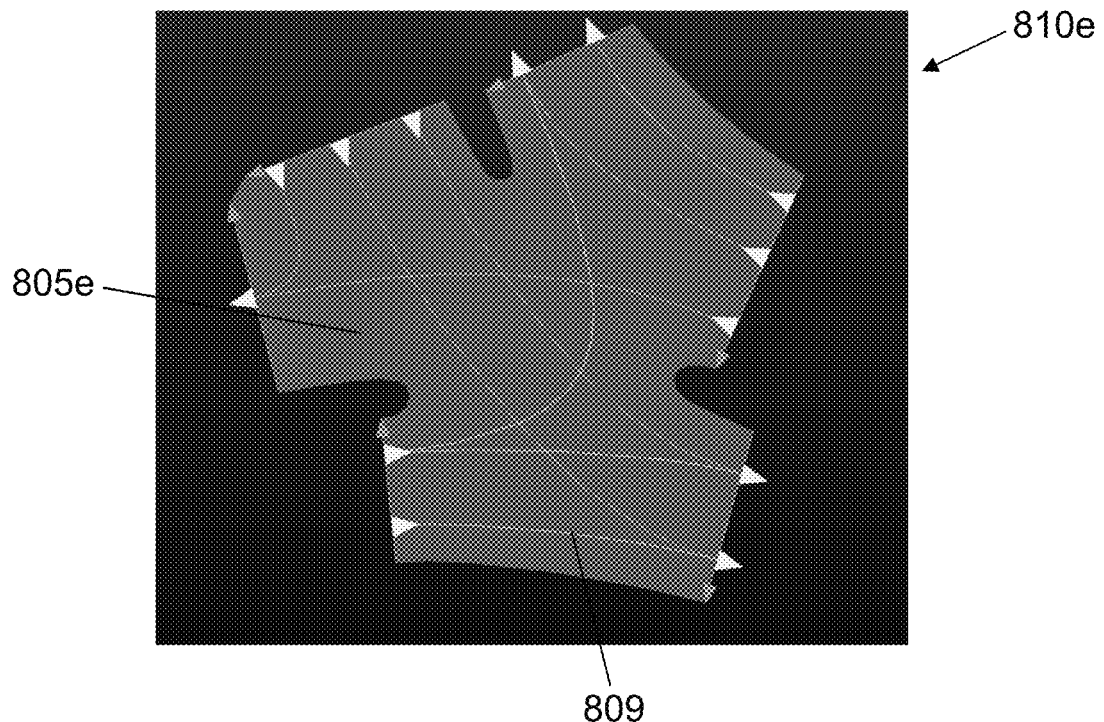
FIG. 8e illustrates schematically a complete set of lane traversals for another road intersection.
Figure 8F:
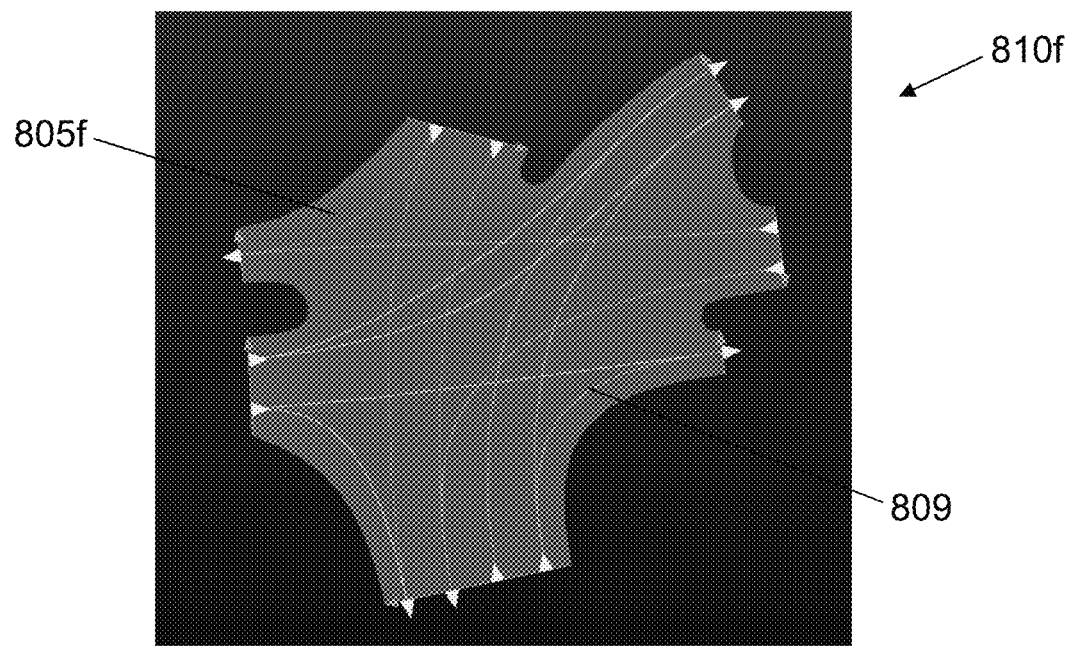
FIG. 8f illustrates schematically a complete set of lane traversals for another road intersection.

FIGS. 7a-7e respectively illustrate an unmapped outbound lane 711, an unmapped inbound lane 712, a merging lane 713 and a forming lane 714. For clarity, only straight line traversals are shown for a single incoming road and other lane traversals in the complete set are hidden. As shown, an unmapped outbound lane 711 is an outbound lane 706b with no associated (i.e. connected) inbound lane 706a; an unmapped inbound lane 712 is an inbound lane 706a with no associated outbound lane 706b; a merging lane 713 is an inbound lane 706a which merges into another inbound lane 706a from the same road segment 707 within the road intersection 705; and a forming lane 714 is an outbound lane 706b which is formed by splitting an inbound lane 706a within the road intersection 705. FIG. 7e shows a lane gap which is an unmapped outbound lane 711 located between two mapped outbound lanes in the same road segment 707.

One way of scoring each set of lane traversals using both of the above-mentioned safety-traffic flow criteria is to first identify any constituent lane traversals which have a substantially straight path of travel and assign a "geometry score" to each substantially straight lane traversal based on the curvature of its associated path of travel. For example, a substantially straight lane traversal 409 with no curvature or a low curvature (FIG. 4a) may respectively be assigned a "perfect" or "good" score (which may be high or low depending on the particular scoring mechanism), a substantially straight lane traversal 409 with a medium curvature (FIG. 4b) may be assigned an "acceptable" score, and a substantially straight lane traversal 409 with a high curvature (FIG. 4c) may be assigned a "poor" score (which may be low or high depending on the particular scoring mechanism). These numerical scores essentially reflect the amount by which a driver would need to turn the steering wheel in order to follow the lane traversal. Since a given set of lane traversals will often contain multiple substantially straight traversals, its overall geometry score is the sum of the geometry scores for all of the substantially straight lane traversals.

The next step is to identify the occurrence of one or more predefined safety-traffic flow features within the substantially straight lane traversals and assign a penalty score to each of the identified predefined safety-traffic flow features. The penalty score is designed to penalise a set of lane traversals if it contains certain undesirable properties. For instance, the occurrence of an unmapped outbound lane 711 (FIG. 7a), an unmapped inbound lane 712 (FIG. 7b), a merging lane 713 (FIG. 7c), a forming lane 714 (FIG. 7d) and a lane gap (not shown) would each be assigned a penalty score. In some cases, each predefined safety-traffic flow feature may be assigned the same score, but in other cases, they may be assigned different scores which reflect their redundancy or their impact on safety and traffic congestion. For example, if the unmapped inbound lane 712 of FIG. 7b could be used to form a turn or u-turn traversal, the penalty score may be less severe than it would be if turn or u-turn traversals from that lane were not physically or legally possible. As with the geometry score, an overall penalty score can be determined for a given set of lane traversals by summing the individual penalty scores associated with each of the identified safety-traffic flow features. Once the overall geometry and penalty scores have been determined, they can then be combined to produce a total score for that particular set of lane traversals.

The apparatus is then able to identify a complete set of lane traversals from the two or more different complete sets of lane traversals based on their respective safety-traffic flow scores for use in route navigation. Depending on the scoring mechanism, the apparatus may be configured to identify the complete set of lane traversals with the highest or lowest safety-traffic flow score. Identification of this "optimum" set of lane traversals may involve one or more of selecting and providing the set of lane traversals for use by a user. For example, the apparatus may be configured to cause the set of lane traversals to be displayed over a digital map as the user approaches the road intersection to facilitate route navigation through the intersection. Additionally or alternatively, the apparatus may be configured to provide driving instructions to the user based on the set of lane traversals.

In the future, many vehicles will have cameras with the ability to detect road features (e.g. signs, road markings, dividers, etc.). This is especially true for HAD applications. There would be value in running the algorithm in a device (i.e. in the car's navigation system) if the car detects differences between reality and the published map. For example, if a car is approaching an intersection, and the published map indicates that left turns are allowed but the car sees a 'no left turn' sign, the car can run the lane traversal algorithm with a new constraint to generate a more likely set of lane traversals than those published in the map. As another example, if a car is approaching an intersection, and detects that a road or lane is closed due to construction, the car can run the lane traversal algorithm with new constraint, again to generate a more likely set of lane traversals.

It will be appreciated that certain traversals may be time-restricted e.g. left turns only between certain hours of the day. In such cases, it will be appreciated that the apparatus will need to take this into account. Thus, for example, the complete set of lane traversals may only be formed from lane traversal which satisfy this time restriction. In other cases, if such time restricted lane traversals are still used, the safety-traffic flow assigned to the particular complete set of lane traversals will need to appropriately take into account the use of a lane traversal in the set which is actually not permitted during a given time.

FIGS. 8*a*-8*f* illustrate identified sets 810*a-f* of lane traversals 809 for a number of different road intersections 805*a-f*. As can be seen, the present method is not limited to crossroads 205 such as that shown in FIG. 2, but can be applied to any section of a road network where two or more roads or lanes intersect, regardless of complexity.

In some examples, the apparatus may be configured to generate one or more indicators or flags to notify the user of issues associated with the identified set of lane traversals. For instance, the apparatus may be configured to generate one or more of: a "poor-scoring" indicator when the identified set of lane traversals has been assigned a safety-traffic flow score which is above or below a predefined safety-traffic flow score threshold; a "similarly-scoring" indicator when two or more different complete sets of lane traversals have been assigned a substantially similar safety-traffic flow score resulting in no single identifiable set of lane traversals; and a "penalty" indicator when the identified set of lane traversals breaches one or more predefined safety-traffic flow rules or comprises one or more predefined safety-traffic flow features. This feature helps the user to make an informed decision as to whether or not to rely on the set of lane traversals which has been identified by the apparatus. The indicator feature could also be used to determine whether a review of the set of lane traversals is required, for example, by considering a review by an individual or considering driver lane traversal habits for the intersection from multiple sources ("crowd-sourcing").

In some examples, the apparatus may be configured to provide an aggregate safety-traffic flow score for a given geographic area by combining the safety-traffic flow scores of the respective identified sets of lane traversals for a plurality of different road intersections within the geographic area. The aggregate safety-traffic flow score may be a total or average safety-traffic flow score for the geographic area, and could (for example) be used to compare the quality of the lane traversal data for different geographic areas.

Figure 9:
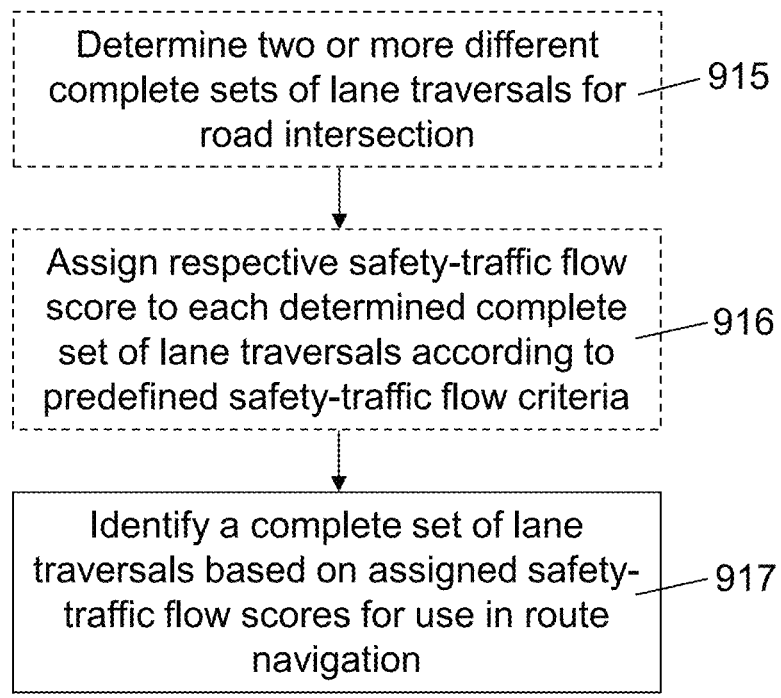
FIG. 9 illustrates schematically the main steps of a method described herein.

The main steps 915-917 of the method described herein are shown schematically in FIG. 9. The method generally comprises: determining 915 two or more different complete sets of lane traversals for a road intersection; assigning 916 a respective safety-traffic flow score to each determined complete set of lane traversals according to predefined safety-traffic flow criteria; and identifying 917 a complete set of lane traversals based on the assigned safety-traffic flow scores for use in route navigation. As mentioned previously, whilst the apparatus described herein is configured to perform the identifying step 917, it may or may not be configured to perform the prerequisite determining 915 or assigning 916 steps of the method, hence the dashed boxes. These prerequisite steps 915, 916 could (for example) be performed by a further apparatus which is remote to or separate from the apparatus, such as a remote server. In this scenario, the apparatus could receive the two or more scored sets of lane traversals from the server and identify 917 one of these sets based on their respective scores for use in route navigation.

Figure 10:
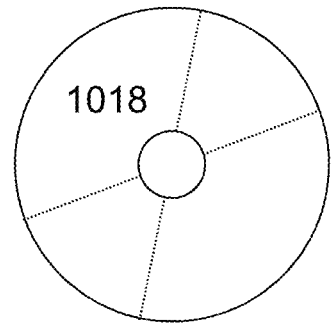
FIG. 10 shows a computer-readable medium comprising a computer program configured to perform, control or enable one or more methods described herein.

FIG. 10 illustrates schematically a computer/processor readable medium 1018 providing a computer program according to one embodiment. The computer program may comprise computer code configured to perform, control or enable one or more of the method steps 915-917 of FIG. 9. In this example, the computer/processor readable medium 1018 is a disc such as a digital versatile disc (DVD) or a compact disc (CD). In other embodiments, the computer/processor readable medium 1018 may be any medium that has been programmed in such a way as to carry out an inventive function. The computer/processor readable medium 1018 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state).

The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signaling" may refer to one or more signals transmitted as a series of transmitted and/or received signals. The series of signals may comprise one, two, three, four or even more individual signal components or distinct signals to make up said signaling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code for one or more programs, the at least one memory and computer program code configured to, with the at least one processor, cause the apparatus to perform at least the following:
   filter two or more different complete sets of lane traversals based, at least in part, on one or more known safety-traffic flow restrictions;
   generate safety-traffic flow scores for the two or more different complete sets of lane traversals according to one or more safety-traffic flow criteria, wherein the safety-traffic flow scores comprise a poor-scoring indicator, a similarly-scoring indicator, a penalty indicator, or a combination thereof;
   identify, for use in route navigation, a complete set of lane traversals for a road intersection from the filtered two or more different complete sets of lane traversals based on the safety-traffic flow scores; and
   provide one or more driving instructions on an audio user interface, a video user interface, or a combination thereof based on the complete set of lane traversals for use in navigating the road intersection,
   wherein each lane traversal defines a path of travel from an inbound lane of the road intersection to an outbound lane of the road intersection, and
   wherein each different complete set of lane traversals comprises a different combination of lane traversals for the road intersection.

2. The apparatus of claim 1, wherein the two or more different complete sets of lane traversals are predetermined by filtering all possible complete sets of lane traversals for the road intersection to leave only complete sets of lane traversals which comprise one or more pre-traveled lane traversals.

3. The apparatus of claim 1, wherein the two or more different complete sets of lane traversals are predetermined to comprise only complete sets of lane traversals which satisfy one or more predefined safety-traffic flow rules.

4. The apparatus of claim 3, wherein the one or more predefined safety-traffic flow rules comprise any lane traversals which begin on a same road segment cannot cross paths, each inbound lane of the road intersection must be associated with one or at least one outbound lane of the road intersection, or a combination thereof.

5. The apparatus of claim 1, wherein the two or more different complete sets of lane traversals are predetermined by filtering all possible complete sets of lane traversals for the road intersection to leave only complete sets of lane traversals which satisfy one or more user-defined safety-traffic flow preferences.

6. The apparatus of claim 5, wherein the one or more user-defined safety-traffic flow preferences comprise desirable lane traversals, undesirable lane traversals, desirable types of lane traversal, undesirable types of lane traversal, or a combination thereof.

7. The apparatus of claim 1, wherein the safety-traffic flow scores are assigned to each of the filtered two or more different complete sets of lane traversals based on the one or more safety-traffic flow criteria comprising: a geometry of the paths of travel defined by constituent lane traversals; and an occurrence of one or more predefined safety-traffic flow features within the complete set of lane traversals.

8. The apparatus of claim 1, wherein the safety-traffic flow scores are assigned to each of the filtered two or more different complete sets of lane traversals by:
   identifying any constituent lane traversals which define a substantially straight path of travel;
   assigning a geometry score to each substantially straight lane traversal based on a curvature of its associated path of travel;
   identifying an occurrence of one or more predefined safety-traffic flow features within the complete set of lane traversals;
   assigning a penalty score to each of the identified predefined safety-traffic flow features; and
   combining the geometry and penalty scores to produce a total score for the complete set of lane traversals.

9. The apparatus of claim 7, wherein the one or more predefined safety-traffic flow features of the complete set of lane traversals comprise unmapped outbound lanes, unmapped inbound lanes, merging lanes, lane gaps, or a combination thereof.

10. The apparatus of claim 1, wherein the apparatus is configured to identify the complete set of lane traversals with a safety-traffic flow score that meets a predefined safety-traffic flow score threshold for use in route navigation.

11. The apparatus of claim 1, wherein the apparatus is configured to provide an aggregate safety-traffic flow score for a given geographic area by combining the safety-traffic flow scores of the respective identified complete sets of lane traversals for a plurality of different road intersections within the geographic area.

12. The apparatus of claim 11, wherein the aggregate safety-traffic flow score is a total or average safety-traffic flow score for the geographic area.

13. The apparatus of claim 1, wherein the poor-scoring indicator represents the complete set of lane traversals with a safety-traffic flow score that does not satisfy a predefined safety-traffic flow score threshold; the similarly-scoring indicator represents the two or more different complete sets of lane traversals with a substantially similar safety-traffic flow score resulting in no single identifiable complete set of lane traversals; and the penalty indicator represents the identified complete set of lane traversals that breaches one or more predefined safety-traffic flow rules or comprises one or more predefined safety-traffic flow features.

14. The apparatus of claim 1, wherein the road intersection is predefined by one or more of a number, a location, a size, a shape, a geometry, and a traffic flow direction of its inbound and outbound lanes.

15. The apparatus of claim 1, wherein the road intersection comprises one or more of a signalized intersection, an un-signalized intersection, a junction, a crossroad, a roundabout, an interchange, an onramp, an off-ramp, a road or lane merge, a road or lane split, or a combination thereof.

16. The apparatus of claim 8, wherein a perfect geometry score is assigned to the substantially straight lane traversal with no curvature or a low curvature, an acceptable geometry score is assigned to the substantially straight lane traversal with a medium curvature, and a poor geometry score is assigned to the substantially straight lane traversal with a high curvature.

17. A method comprising:
filtering, by an apparatus, two or more different complete sets of lane traversals based, at least in part, on one or more known safety-traffic flow restrictions;
generating safety-traffic flow scores for the two or more different complete sets of lane traversals according to one or more safety-traffic flow criteria, wherein the safety-traffic flow scores comprise a poor-scoring indicator, a similarly-scoring indicator, a penalty indicator, or a combination thereof;
identifying, by the apparatus, for use in route navigation, a complete set of lane traversals for a road intersection from the filtered two or more different complete sets of lane traversals based on the safety-traffic flow scores; and
providing, by the apparatus, one or more driving instructions on an audio user interface, a video user interface, or a combination thereof based on the complete set of lane traversals for use in navigating the road intersection,
wherein each lane traversal defines a path of travel from an inbound lane of the road intersection to an outbound lane of the road intersection, and
wherein each different complete set of lane traversals comprises a different combination of lane traversals for the road intersection.

18. The method of claim 17, wherein the poor-scoring indicator represents the complete set of lane traversals with a safety-traffic flow score that does not satisfy a predefined safety-traffic flow score threshold; the similarly-scoring indicator represents the two or more different complete sets of lane traversals with a substantially similar safety-traffic flow score resulting in no single identifiable complete set of lane traversals; and the penalty indicator represents the identified complete set of lane traversals that breaches one or more predefined safety-traffic flow rules or comprises one or more predefined safety-traffic flow features.

19. A non-transitory computer-readable storage medium carrying one or more sequences of one or more instructions which, when executed by one or more processors, cause an apparatus to at least perform the following steps:
filtering two or more different complete sets of lane traversals based, at least in part, on one or more known safety-traffic flow restrictions;
generating safety-traffic flow scores for the two or more different complete sets of lane traversals according to one or more safety-traffic flow criteria, wherein the safety-traffic flow scores comprise a poor-scoring indicator, a similarly-scoring indicator, a penalty indicator, or a combination thereof;
identifying, for use in route navigation, a complete set of lane traversals for a road intersection from the filtered two or more different complete sets of lane traversals based on the safety-traffic flow scores; and
providing one or more driving instructions on an audio user interface, a video user interface, or a combination thereof based on the complete set of lane traversals for use in navigating the road intersection,
wherein each lane traversal defines a path of travel from an inbound lane of the road intersection to an outbound lane of the road intersection, and
wherein each different complete set of lane traversals comprises a different combination of lane traversals for the road intersection.

20. The non-transitory computer-readable storage medium of claim 19, wherein the poor-scoring indicator represents the complete set of lane traversals with a safety-traffic flow score that does not satisfy a predefined safety-traffic flow score threshold; the similarly-scoring indicator represents the two or more different complete sets of lane traversals with a substantially similar safety-traffic flow score resulting in no single identifiable complete set of lane traversals; and the penalty indicator represents the identified complete set of lane traversals that breaches one or more predefined safety-traffic flow rules or comprises one or more predefined safety-traffic flow features.

\* \* \* \* \*